United States Patent [19]

Hasler et al.

[11] 4,337,491

[45] Jun. 29, 1982

[54] BRUSHLESS D.C. MOTOR ASSEMBLY

[75] Inventors: Alfred Hasler, Mountain View, Calif.; Bernhard Schuh, Simsbury, Conn.

[73] Assignees: International Memories, Inc., Cupertino, Calif.; Papst-Motoren KG, Schwarzwald, Fed. Rep. of Germany

[21] Appl. No.: 154,542

[22] Filed: May 29, 1980

Related U.S. Application Data

[63] Continuation of Ser. No. 957,769, Nov. 3, 1978, abandoned.

[51] Int. Cl.³ .............................................. G11B 25/04
[52] U.S. Cl. ...................................... 360/97; 360/137
[58] Field of Search ............................... 360/102–103, 360/97–99, 104, 86, 137; 310/68, 268

[56] References Cited

U.S. PATENT DOCUMENTS

| | | | |
|---|---|---|---|
| 2,899,260 | 8/1959 | Farrand et al. | 360/98 |
| 3,891,905 | 6/1975 | Müller | 310/68 X |
| 4,005,490 | 1/1977 | Duncan et al. | 360/103 |
| 4,011,475 | 3/1977 | Schmider | 310/68 R |
| 4,092,687 | 5/1978 | Butsch | 360/102 |
| 4,101,945 | 7/1978 | Butsch | 360/102 |

*Primary Examiner*—John H. Wolff
*Attorney, Agent, or Firm*—John L. McGannon

[57] ABSTRACT

An improved motor assembly including a brushless D.C. motor and an annular member defining a platform for the drive electronics and speed control circuits of the motor. The member is carried on a fixed support within the outer envelope of the motor and includes a thin disk-like body providing a pair of opposed surfaces for mounting the components of the circuits. The fixed support of the motor has a flat annular face surrounding the drive shaft of the motor, and the annular member engages and is secured to the flat face of the support in surrounding relationship to the shaft. In a preferred embodiment, the housing of the motor defines part of the rotor of the motor and is for rotation with the shaft. A flange is secured to the support near the opposite end of the shaft for mounting the motor on a fixed support, such as on the base of a housing forming a part of a disk drive unit. Impeller blades can be secured to one end of the shaft or to the side of the housing to supply cooling air to a region adjacent to the motor.

8 Claims, 5 Drawing Figures

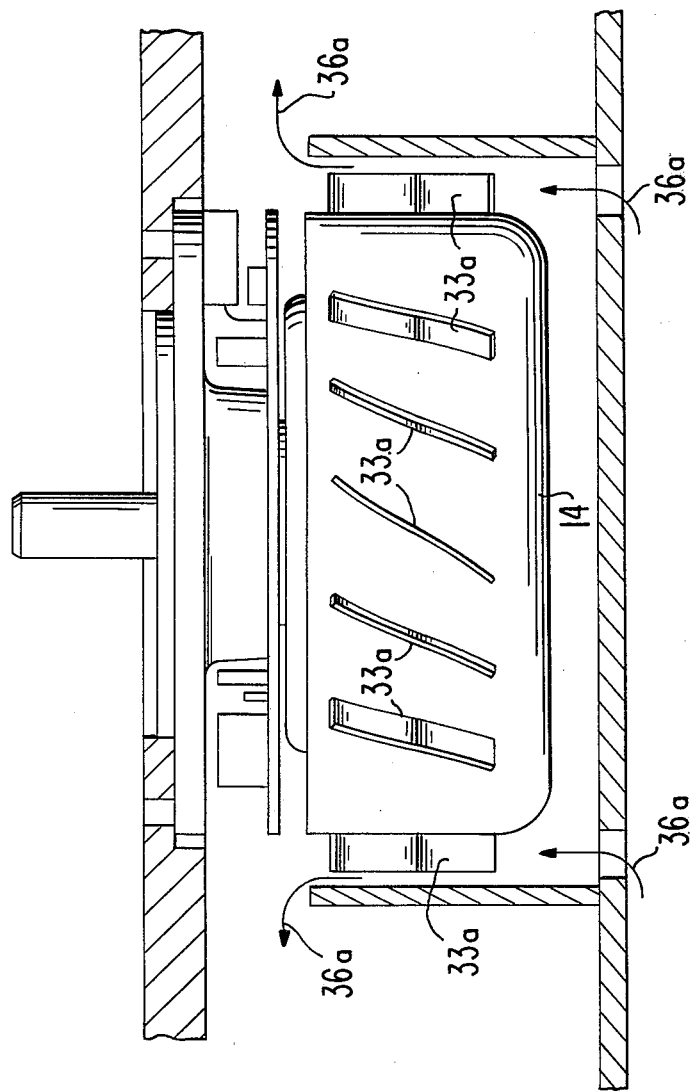

BRUSHLESS D.C. MOTOR ASSEMBLY

This is a continuation of application Ser. No. 957,769, filed Nov. 3, 1978.

This invention relates to improvements in brushless D.C. motors and, more particularly, to a motor of this type which is essentially self-contained except for its connection with an external source of electrical power.

BACKGROUND OF THE INVENTION

Brushless D.C. motors are typically provided with electrical circuitry which provides the drive electronics and the speed control means therefor. The drive electronics provides the electronic means which replaces the brushes and commutators of conventional D.C. motors. The speed control means is typically an optical tachometer which senses the speed of rotation of the drive shaft of the motor and applies signals to the drive electronics to control the speed of the shaft. The optical device of the tachometer also acts as a sensor for sensing the position of the rotar for communication of the currents to the motor windings.

In the past, the drive electronics and speed control circuits have been mounted in a "black box" which is separate and apart from the motor. This "black box" takes up additional space and requires a cable connecting it with the magnetic means, such as the field coils, of the motor.

The use of such a "black box" in conventional D.C. motors cannot be tolerated in certain applications because of space limitations. For instance, a disk drive unit is being made as small as practical and must be as compact as possible yet must have all of the features for driving magnetic disks as are found in larger disk drive units. Brushless D.C. motors are suitable for this application because of their reliability, absence of arcing, such as occurs at the brushes of conventional D.C. motors, and the ease of operation when coupled to a hub carrying a pair of spaced magnetic disks. Use of a conventional brushless D.C. motor for this application is not satisfactory because space would have to be provided for its "black box". This would in all likelihood be an inconvenience for the user of the disk drive unit. Because of the foregoing drawbacks, a need has arisen for an improved brushless D.C. motor, one in which the "black box" of the type described is eliminated.

SUMMARY OF THE INVENTION

The present invention satisfies the aforesaid need by providing an improved brushless D.C. motor assembly which includes not only the motor itself but also a platform within the confines of the motor envelope for supporting the drive electronics and speed control circuits of the type described. This assembly, therefore, completely eliminates the need for the "black box" of the type described so that the assembly is suitable for a wide variety of uses, including use as the drive motor for the disks of a disk drive unit.

The drive motor assembly of this invention includes a drive shaft surrounded by a support carrying bearings which journal the shaft for rotation, the support having means for connecting it to an annular disk-like member provided with a pair of opposed faces on which the drive electronics and speed control circuits are mounted. Since the annular member is within the envelope of the drive motor, the drive motor assembly is essentially self-contained except for the fact that it has leads for connection to an external source of electrical power, thereby causing the assembly to be highly compact without adding to its weight and without distracting from its high reliability.

The primary object of the invention is to provide an improved brushless D.C. motor assembly which eliminates the need for a "black box" for containing the drive electronics and speed control circuits so that these circuits can form a part of the motor assembly and be within the envelope of the motor housing to provide a compact unit suitable for a wide variety of uses, especially use as the drive motor of a disk drive unit.

Other objects of this invention will become apparent as the following specification progresses, reference being had to the accompanying drawing for an illustration of an embodiment of the invention.

IN THE DRAWING

FIG. 5 is a view similar to FIG. 1 but showing a number of spaced impeller blades on the outer surface of the motor housing.

Figures 1, 2:
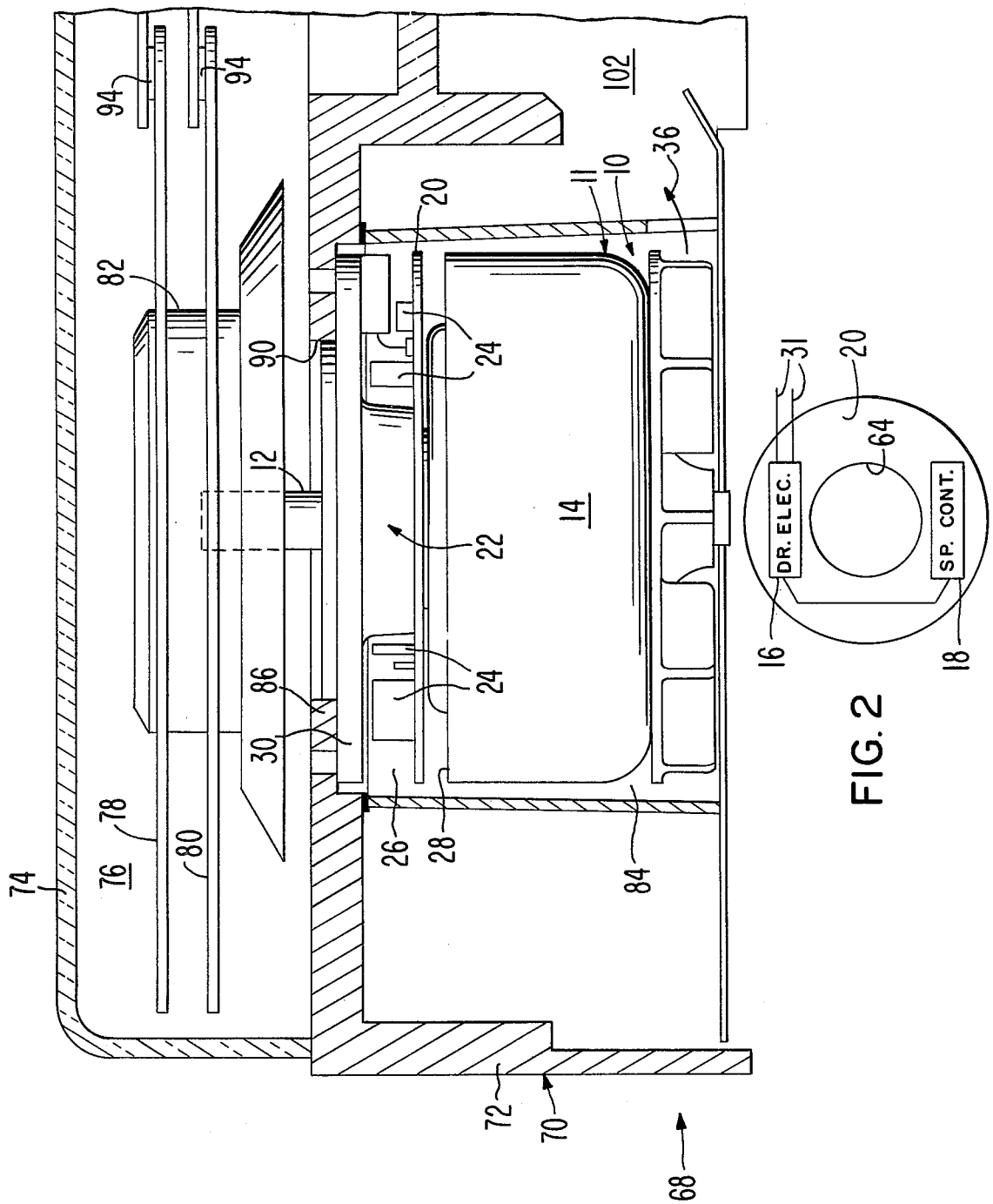
FIG. 1 is a side elevational view, partly in section, of the improved brushless D.C. motor assembly of this invention, showing one way in which it can be mounted, such as in the housing of a disk drive unit of the type having a pair of magnetic disks mounted on a rotatable hub.
FIG. 2 is a top plan view of an annular member forming a part of the drive motor assembly and serving as a platform for the circuitry, including the drive electronics circuit and speed control circuit, of the drive motor of the assembly, the annular member being on a reduced scale with reference to that of FIG. 1.
Figure 3:
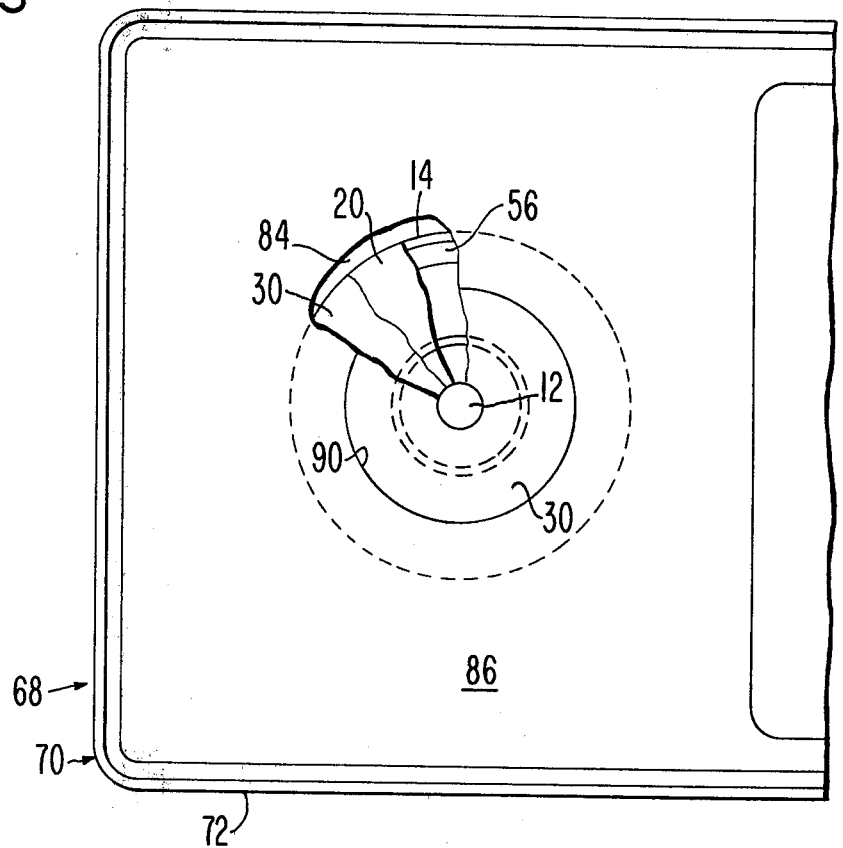
FIG. 3 is a top plan view of the drive motor assembly coupled with the disk drive unit of FIG. 1 with the housing cover and hub removed, parts being broken away to illustrate details of construction of the drive motor assembly.

The improved brushless D.C. motor assembly of this invention is broadly denoted by the numeral 10 and includes a conventional brushless D.C. motor 11 which includes a rotatable drive shaft 12, an outer, hollow housing 14 surrounding the coils, iron cores and permanent magnets (hereinafter described) of a motor of this type, drive electronics circuit 16 for said coils, and speed control circuit 18 coupled with circuit 16 for controlling the speed of rotation of shaft 12. All of the foregoing elements of motor 11 are old and, in combination, define a conventional brushless D.C. motor. The improvement afforded by the present invention is the use of an annular member 20 coupled to a fixed part or central support 22 of motor 11 for supporting drive electronics circuit 16 and speed control circuit 18 so that these circuits form a compact unit with motor 11. This feature eliminates the need for a "black box" spaced from the motor for housing these two circuits. Such a "black box" has been used in the past for conventional motors of this type.

As shown in FIG. 1, the various components 24 of circuits 16 and 18 are shown in the space 26 between the upper marginal edge 28 of motor housing 14 and an annular mounting flange 30 rigid to central support 22 of motor 11. Leads 31 extend away from circuits 16 and 18 and are adapted to be connected to a D.C. voltage source.

Assembly 10 can include a fan 32 having a number of impeller blades 33 rigid to one end 34 of shaft 12, the shaft end 34 projecting outwardly and downwardly from the bottom of housing 14. Fan 32 is adapted to direct air laterally and in the direction of arrow 36 (FIG. 1) for cooling purposes hereinafter described. In the alternative, a number of spaced impeller blades 33a (FIG. 5) could be mounted on the outer surface of housing 14 for rotation therewith. These blades operate to move air along paths denoted by arrows 36a also for cooling purposes to be described.

Figure 4:
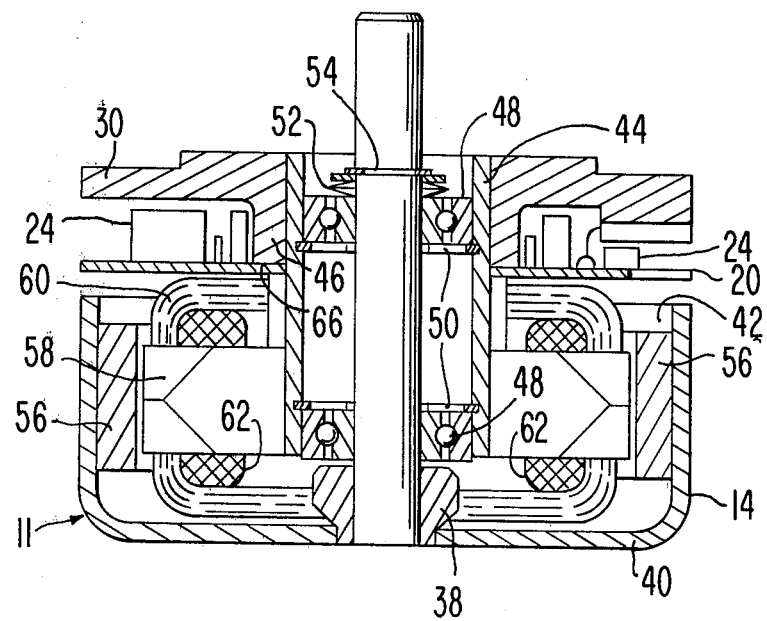
FIG. 4 is a cross-sectional view of the drive motor assembly.

FIG. 4 shows the way in which motor 10 is assembled. Shaft 12 is rigidly secured by bushing 38 to the bottom 40 of housing 14, the latter having an open top 42 so that a central sleeve 44 surrounding the shaft can project upwardly from the housing. Sleeve 44 forms a part of central support 22, the sleeve being press-fitted in a tubular member 46 with which flange 30 is integral. A pair of bearings 48 within sleeve 44 rotatably mount shaft 12 within the sleeve so that the shaft and housing 14 rotate relative to the sleeve and flange 30 when the flange is mounted in a fixed position to adjacent structure as hereinafter described. A pair of spaced retaining rings 50 hold the bearings in place. Moreover, a Bellview washer assembly 52 held by a retaining ring 54 biases the shaft in an upward direction relative to sleeve 44.

Housing 14 has a number of permanent magnets 56 secured to the inner surface thereof for rotation therewith. These magnets surround iron cores 58 provided for a number of coils 60 and 62. Magnets 56, cores 58 and coils 60 and 62 are conventional elements for brushless D.C. motors of this type. Housing 14 and magnets 56 form the rotor of motor 11.

Annular support member 20 has an outer diameter essentially the same as that of housing 14 and flange 30. Thus, member 20 is retained within the outer envelope of motor 11 to form a compact unit therewith. Member 20 has a central hole 64 (FIG. 2) therethrough which is of a size sufficient to permit the member to be placed over sleeve 44 and against a lower, flat face 66 on tubular member 46 (FIG. 4). Member 20 is secured to face 66 in any suitable manner, such as by fasteners or by an adhesive. The axial length of tubular member 46 is sufficient to allow components 24 to be accommodated in space 26 without interference with flange 30.

While motor assembly 11 can be used in a number of different applications, it will be described as being useful with a disk drive unit 68 of the type having a housing or casing 70 provided with a base 72 and a removable cover 74. The space 76 within cover 74 and above base 72 is adapted to contain a pair of rotatable disks 78 and 80 rigidly secured to a hub 82 which is to be adjustably and removably secured to the upper end of shaft 12.

Base 72 has a space 84 for receiving motor assembly 10 and a top web 86 to which flange 30 is releasably connected, such as by screw fasteners or the like. In such a position, shaft 12 extends upwardly through an opening 90 in web 86 so that the upper end of the shaft projects into space 76 to allow hub 82 to be secured to shaft 12 for rotation therewith within space 76. If fan 32 is used with assembly 10, it is connected to the lower end of shaft 32 and operates to blow cooling air in the direction of arrow 36, such as into lateral region 102 which might contain circuit boards and other electronic circuitry connected with the shiftable read-write heads 96 (FIG. 1) associated with disks 78 and 80.

In use, motor assembly 10 is coupled to base 72 with flange 30 secured to web 86. The power supplied to the drive electronics and speed control circuits 16 and 18 causes motor 11 to be energized, causing shaft 12 and housing 14 to rotate within space 84 relative to flange 30 and support 22. As motor housing 14 rotates, disks 78 and 80 are rotated relative to heads 94 as member 20 remains stationary. Impeller blades 33 or 33a are rotated with housing 14 and direct air laterally for the purpose mentioned above.

We claim:

1. In a magnetic disk recording assembly of the type having a casing provided with a pair of adjacent air flow chambers separated by a wall with one of the chambers having a magnetic disk for rotation relative to a magnetic read-write head and the other chamber being isolated from the first chamber and containing first circuitry means for the head, the improvement comprising a brushless D.C. motor having an external housing; means coupled with the motor for mounting it on the casing externally of said one chamber, said motor having a fixed part and a shaft rotatable relative to the fixed part, the shaft adapted to extend through said wall of the casing and to be coupled at one end thereof to the magnetic disk for rotating the magnetic disk about its central axis, the motor having second circuitry means for controlling the excitation of the motor, and an annular support member carried by the fixed part in surrounding relationship to the shaft of the motor, said second circuitry means being mounted on the support member.

2. In a magnetic disk recording assembly as set forth in claim 1, wherein the external housing of the motor has means secured to the shaft for mounting the external housing on the shaft for rotation therewith, the housing having an open end, the fixed part being near the open end and the circuitry mounting means being exteriorly of the housing.

3. In a magnetic disk recording assembly as set forth in claim 2, wherein the mounting means includes a platform in a plane extending transversely to the shaft.

4. In a magnetic disk recording assembly as set forth in claim 3, wherein the annular member is secured to the fixed part and surrounds the shaft.

5. In a magnetic disk recording assembly as set forth in claim 1, wherein is included a fan mounted on the opposite end of the shaft for blowing air into the other chamber when the shaft rotates.

6. In a magnetic disk recording assembly as set forth in claim 1, wherein the motor has an external housing secured to the shaft for rotation therewith, and including a fan secured to the housing for blowing air into the other chamber when the shaft and housing rotate.

7. In a magnetic disk recording assembly as set forth in claim 6, wherein said housing has an end face remote from the wall, the fan being on said end face.

8. An assembly as set forth in claim 6, wherein said housing has a cylindrical outer surface, said fan including a number of spaced blades secured to said cylindrical outer surface.

* * * * *